(12) United States Patent
Sirois

(10) Patent No.: US 6,817,132 B1
(45) Date of Patent: Nov. 16, 2004

(54) BARREL CHAMBERING METHOD AND APPARATUS

(75) Inventor: Michael A. Sirois, Dover, NH (US)

(73) Assignee: On Target Technologies, LLC, Dover, NH (US)

( * ) Notice: Subject to any disclaimer, the term of this patent is extended or adjusted under 35 U.S.C. 154(b) by 0 days.

(21) Appl. No.: 10/457,132

(22) Filed: Jun. 9, 2003

(51) Int. Cl.[7] .................................................. F41A 23/00
(52) U.S. Cl. ........................ 42/75.1; 42/76.1; 42/76.01; 89/14.05
(58) Field of Search ................................. 42/75.1, 76.1, 42/76.01; 89/14.05

(56) References Cited

U.S. PATENT DOCUMENTS

| | | |
|---|---|---|
| 2,917,809 A | 12/1959 | Braatz |
| 3,382,556 A | 5/1968 | Maillard |
| 3,808,943 A | 5/1974 | Kelly |
| 4,359,810 A | 11/1982 | Osborne et al. |
| 5,243,895 A | 9/1993 | Dickman et al. |
| 5,587,549 A * | 12/1996 | Clouse ........................ 89/14.3 |
| 5,856,631 A | 1/1999 | Julien |
| 6,393,751 B1 | 5/2002 | Liebenberg |
| 6,615,702 B1 * | 9/2003 | Julien ........................ 89/16 |

* cited by examiner

Primary Examiner—Jack Keim
Assistant Examiner—M. Thomson
(74) Attorney, Agent, or Firm—Pierce Atwood; Kevin M. Farrell

(57) ABSTRACT

A method of machining a chamber in a gun barrel by EDM, by using a conductive electrodes which defines the desired shape and dimensions of the chamber. A series of electrodes of progressively increasing diameter may be used. An electrode for an EDM barrel chambering process is an axisymmetrical conductive member, and may include a body, an angular shoulder, a neck, throat area, and a tapered lead angle portion into the bore along with other features of a selected cartridge chamber.

6 Claims, 3 Drawing Sheets

BARREL CHAMBERING METHOD AND APPARATUS

BACKGROUND OF THE INVENTION

This invention relates generally to gun chambering and more particularly to a method for chambering a gun barrel.

A barrel for a modern small arm typically includes an integral chamber which receives and supports a cartridge casing during firing. Most commonly used cartridges are identified by a standard specification defined by a recognized commercial standards organization, for example the Sporting Arms & Ammunition Manufacturer's Institute ("SAAMI"), or by a military organization such as the North Atlantic Treaty Organization ("NATO"). These specifications provide nominal dimensions for a cartridge. A firearm intended for a particular caliber is manufactured having chamber dimensions designed to accept the specified cartridge with clearances that ensure reliable functioning under expected operating conditions. These operating conditions may include normal manufacturing variations in the cartridge, and in the case of military arms, rapid or crude manufacturing standards or operation under adverse conditions.

In order to achieve more consistent performance, guns and ammunition may be custom-made to stricter-than-standard tolerances. For example, a competitive target shooter firing carefully hand-loaded ammunition under clean, controlled conditions may be able to use a gun with a chamber machined to a smaller-than-normal diameter in the neck area, or having an increased depth of bullet seating in the barrel rifling. Either of these changes could cause unacceptable loading and extraction problems in a gun designed for ordinary use.

In a further effort to get customized performance, "wildcat" cartridges have been developed. Wildcat cartridges are typically based on a standard cartridge, or a universal cartridge blank as a starting point. The cartridge cases are then "fire-formed" by placing them in a chamber machined to the selected wildcat caliber and firing them. The gas pressure forces the cartridge case to conform to the chamber walls.

In the case of either competitive shooting or wildcatting, it is necessary to form a custom gun chamber. Prior art chambers are formed with chambering reamers. A chambering reamer is a precision cutting tool made from tool steel or similar material. Forming a custom chamber with reamers usually requires three successive cuts, and thus three custom-made reamers. This method is expensive and time consuming. Most reamers are intended for use by hand operation, not machine driven. Furthermore, the reaming process cold-works the barrel, inducing stresses which then must be removed through heat-treatment, which adds to the extra cost of production. In addition, a chambering reamer depends for centering on a pilot which extends into the bore of the barrel, thus degrading concentricity of the chamber to the bore if metal chips are allowed to build up and gall in the pilot area. This can also result in the cutting of a new chamber that is not perfectly centered.

Accordingly, there is a need for an apparatus and method for forming custom chambered gun barrels which is accurate and economical.

BRIEF SUMMARY OF THE INVENTION

The above-mentioned need is met by the present invention, which provides a method and apparatus for machining a gun barrel chambering by an EDM process. A conductive electrode is used which reproduces the desired shape and dimensions of the chamber. A series of electrodes of progressively increasing diameter may be used. Also, an electrode for an EDM barrel chambering process is provided in the form of an axisymmetrical conductive member, and may include a body with taper, an angular shoulder, a neck, a throat area, and a tapered lead angle portion into the bore along with other features of a selected cartridge chamber.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
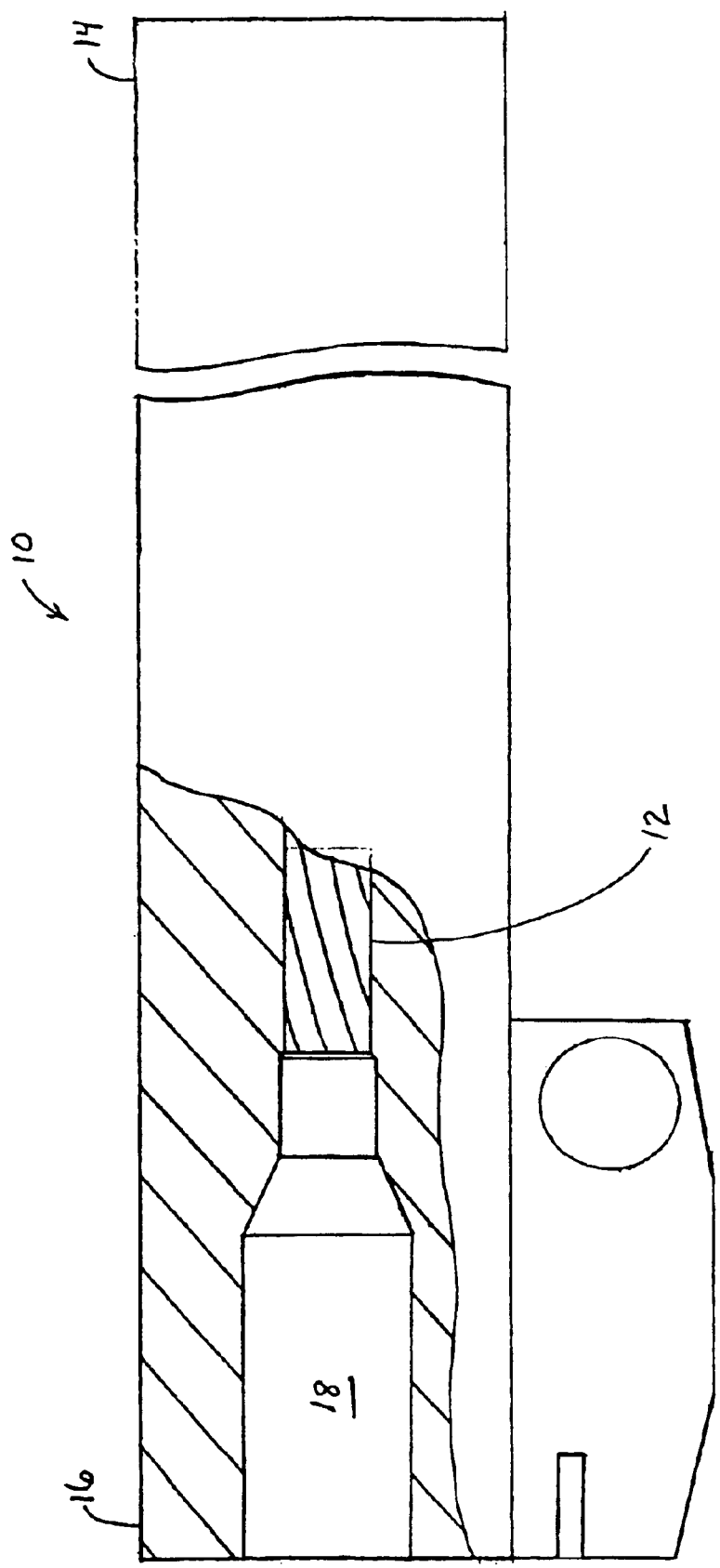
FIG. 1 shows a side view of a gun barrel having an integral chamber.

Referring to the drawings wherein identical reference numerals denote the same elements throughout the various views, FIG. 1 shows a cross-section of a typical gun barrel. The barrel 10 is a generally cylindrical, hollow member of an appropriate material such as steel. The barrel has a bore 12 formed therethough which is usually rifled in a known manner. The barrel has a muzzle end 14 and a breech end 16. A chamber 18 is formed in the breech end 16 to receive and support a cartridge.

Figure 3:
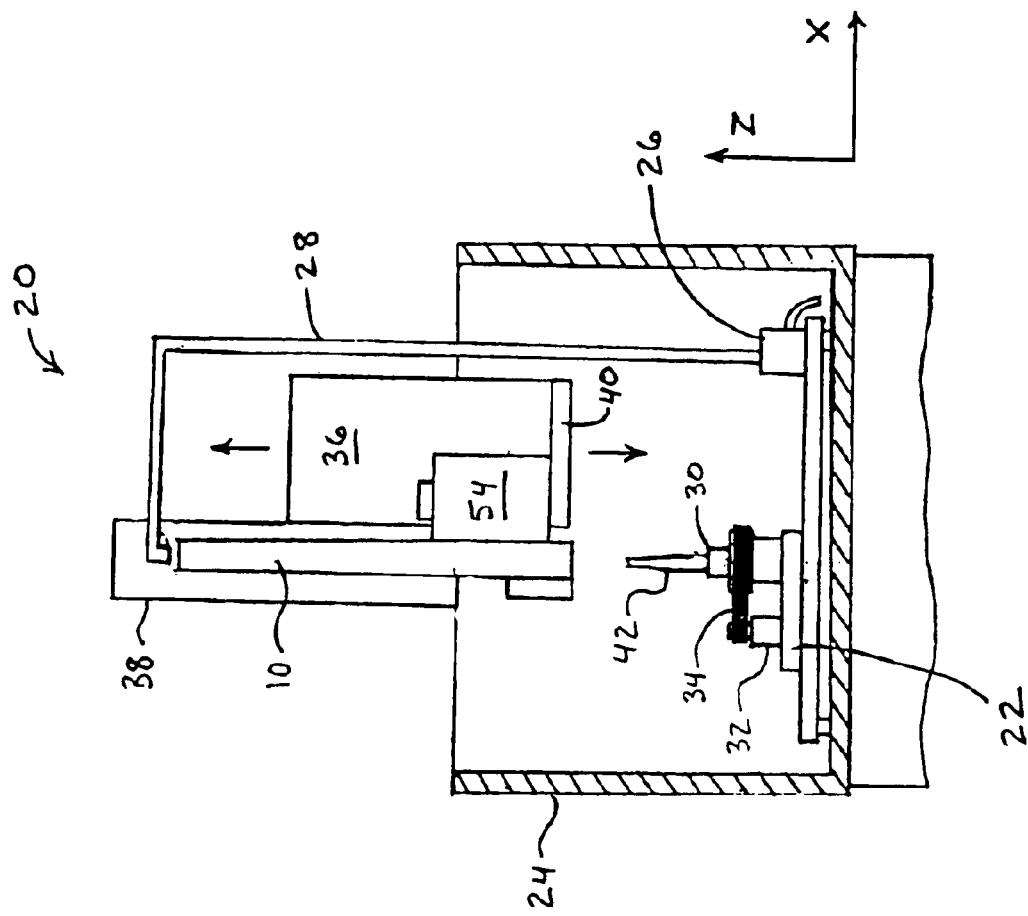
FIG. 3 shows a partially-sectioned, schematic front view of a EDM machine for use with the present invention.
Figure 2:
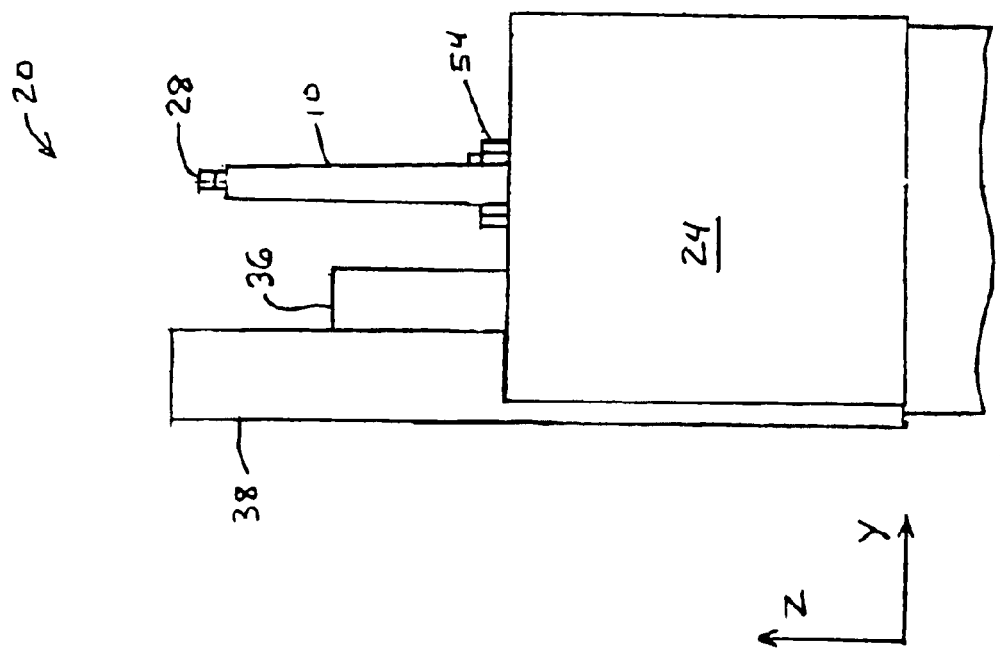
FIG. 2 shows a schematic side view of an EDM machine for use with the present invention.

FIGS. 2 and 3 show schematic side and top views respectively of an electro discharge machining (EDM) machine 20 for carrying out the chambering method of the present invention. The machine 20 includes a table 22 movable in X and Y directions in a known manner, surrounded by an open-topped tank 24 (the tank 24 is shown in cross-section in FIG. 3). The tank 24 holds a dielectric fluid supply which is circulated by a pump 26 and directed through appropriate piping 28. A rotating electrode holder 30 is attached to the table 22 and a drive motor 32 is connected to the electrode holder, for example with a belt 34. An EDM power supply 36 is mounted on a vertical column 38 over the table 22 and is movable in the Z direction in a known manner, as shown by the arrows in FIG. 3. A horizontally extending base plate 40 is attached to the EDM power supply. The entire EDM machine 20 may be computer-controlled.

Figure 4:
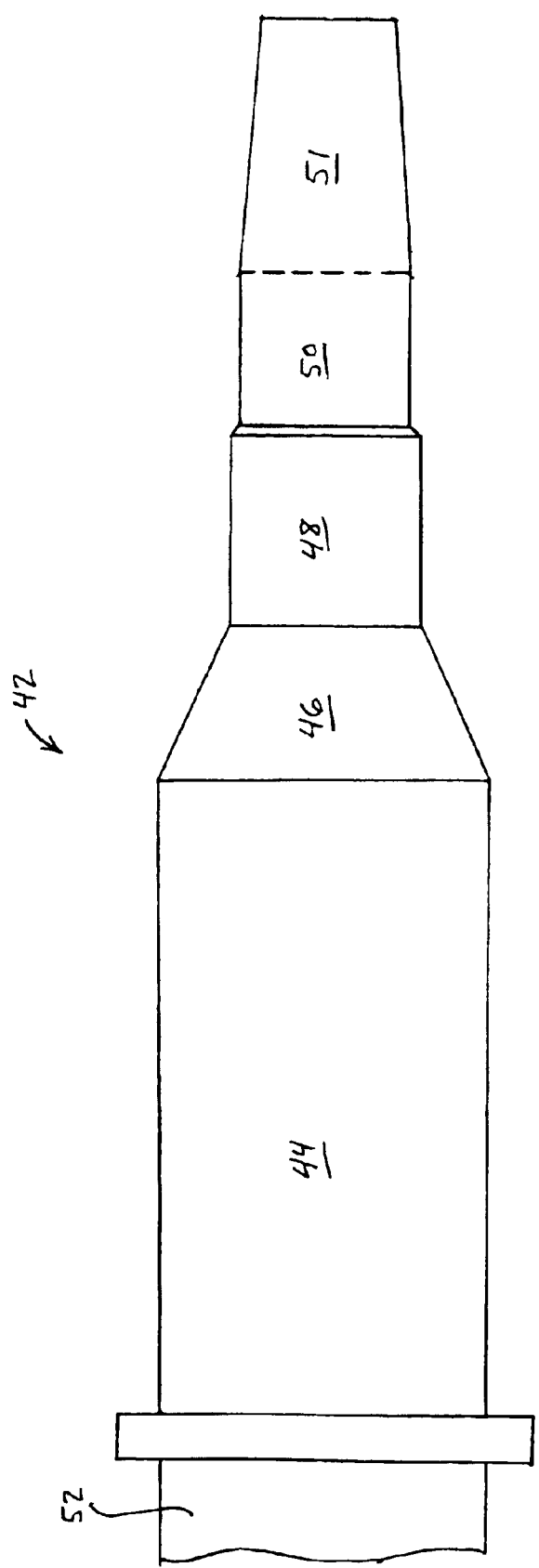
FIG. 4 shows a side view of an EDM electrode for use with the present invention.

FIG. 4 shows a side view of an EDM chambering electrode 42 constructed in accordance with the present invention. Throughout this specification, the reference numeral 42 is used to refer to the chambering electrode whether that particular electrode be a "roughing" electrode or a "finishing" electrode as described below. It will be understood that the roughing and finishing electrodes are of similar form and differ only in dimensions. The chambering electrode 42 is an elongated, axisymmetrical member whose shape represents all of the desired contours of the chamber. In the illustrated example, the chambering electrode 42 is for a center fire, rifle-caliber cartridge and thus includes, in sequence along the longitudinal axis starting at the breech end, a generally cylindrical body 44 of a first diameter, an angular shoulder 46, a neck 48 of a second diameter smaller than the first diameter, a throat area 50 of a third diameter smaller than the second diameter, and a tapered lead angle portion 51. A cylindrical stem 52 extends from the breech end of the body 44 and allows the chambering electrode 42 to be mounted in the electrode holder 30 of the EDM machine 20. The chambering electrode 42 may be formed in any desired shape or dimensions. For example, in a pistol-caliber cartridge (not shown), the chamber may be a simple cylindrical shape lacking a separate angular shoulder or neck. The chambering electrode 42 may also include a rim or a belt (not shown) of a known type, for cartridges including those features. The chambering electrode 42 may also have differing throat areas and lead angles as differing bullet grain weights may require longer throats for seating differences.

The chambering electrode 42 may be easily and economically manufactured. Unlike precision chambering reamers which must be machined from hardened tool steel, the chambering electrode 42 may be constructed from relatively soft materials, nonlimiting examples of which include copper and graphite. The chambering electrode 42 may be easily and quickly machined on a lathe or other suitable machine tool and does not require a hardened cutter or annealing before cutting. This allows rapid, low-cost modification and experimentation.

The dimensions of the chambering electrode are chosen based on the desired amount of overburn for each EDM procedure and the desired final dimensions of the chamber. A specific, nonlimiting example, a cartridge in 6 mm bench rest caliber (or "6 mm BR") has a diameter in the body section of 6.81 mm (0.268 in.) The desired chamber diameter for the body is 6.88 mm (0.271 in.) Accordingly, allowing for an overburn of 0.038 mm (0.0015 in.) radially, the roughing electrode, which is designed to remove material relatively quickly, would have a body diameter of 6.78 mm (0.267 in.), resulting in a chamber body diameter of 6.86 mm (0.270 in.) after the roughing cut. The finishing electrode would have a body diameter of 6.81 mm (0.268 in.), removing the last 0.025 mm (0.001 in.) in diameter, to result in a chamber having a body diameter of 6.88 mm (0.271 in.) and a high-quality surface finish requiring minimal further processing, with very little wear on the electrode itself. A similar stackup of dimensions is used at each point of the chambering electrode. Thus, every part of the chamber can be varied as desired. Shapes such as tapers, radii, and chamfers, including experimental shapes such as concave radiused case shoulders, can be easily produced.

Referring to FIGS. 2 and 3, the chambering procedure is as follows. First, the barrel 10 is mounted to the base plate 40, in a vertical position with the breech end 16 down. In the illustrated example this is done with a known type of magnetic V-block 54. The barrel 10 is then indicated in an known manner to determine the X-Y position of its bore 12, for example using a touch probe (not shown) mounted in the electrode holder 30. Then, a roughing chambering electrode 42, described above, is mounted in the electrode holder 30 and the electrode holder 30 is slewed to the desired X-Y position. Appropriate electrical connections (not shown) are made between the EDM power supply 36, the barrel 10, and the chambering electrode 42. A flow of dielectric fluid is pumped through the muzzle end 14 of the barrel 10. The EDM power supply 36 is turned on and set for the desired parameters, for example 4 Amps at 35 Volts. The base plate 40 is fed downward, advancing the barrel 10 onto the chambering electrode 42. The chambering electrode 42 is rotated during the cut to ensure symmetrical cutting action. If a CNC-type EDM machine 20 is used, it may be programmed to automatically advance the barrel 10 at a selected rate, and to stop the cut when a desired depth (i.e. along the Z-axis) is obtained.

After the roughing cut, the barrel 10 is raised off the roughing electrode 42. The roughing electrode 42 is removed from the electrode holder 30 and replaced with a finish chambering electrode 42. The cutting process is then repeated as described above to form the final dimensions of the chamber 18. The process parameters may be adjusted to produce a finer surface finish, for example the EDM power supply 36 may be set for 2 Amps or less at 35 Volts. After the finish cut is complete, the chamber may be polished with lapping compound to provide the desired surface smoothness. The EDM process leaves a surface finish which minimizes the polishing required.

After the polishing is completed, the barrel 10 is ready for use. The EDM process does not induce any stresses in the barrel 10, and accordingly no stress-relief heat treatment is required after the chambering process is complete. The chambering electrodes 42 may be reused several times before they are too worn for further use. Because the electrodes wear to a smaller diameter as they are used, finishing electrodes may be used as roughing electrodes after they become partially worn.

The above has described an EDM chambering process and an apparatus for carrying out a chambering process. While specific embodiments of the present invention have been described, it will be apparent to those skilled in the art that various modifications thereto can be made without departing from the spirit and scope of the invention as defined in the appended claims.

What is claimed is:

1. A method of machining a cartridge chamber in a gun barrel, comprising:

providing an EDM machine;

providing at least one chambering electrode having a shape defining said cartridge chamber:

providing a gun barrel having a muzzle end, a breech end, and a bore formed therethrough; and electro discharge machining said cartridge chamber into said breech end of said gun barrel using said chambering electrode; and partially machining said cartridge chamber using a roughing chambering electrode; and machining said cartridge chamber to a final dimension using a finishing chambering electrode.

2. The method of claim 1 wherein said chambering electrode comprises the following elements disposed sequentially along a longitudinal axis thereof:

a stud for being received by an electrode holder of said EDM machine;

a cylindrical body having a first diameter;

an angular shoulder;

a cylindrical neck having a second diameter less than said first diameter; and a throat area having a third diameter less than said second diameter.

3. The electrode of claim 2 further comprising a tapered lead angle portion disposed adjacent said throat area.

4. The electrode of claim 2 further comprising a circumferential rim disposed around said body adjacent said stud.

5. The method of claim 2 wherein said chambering electrode comprises graphite.

6. The method of claim 1 further comprising polishing said chamber.

* * * * *